(No Model.)
2 Sheets—Sheet 1.

R. D. NUTTALL.
TROLLEY FOR ELECTRIC CARS.

No. 498,722.
Patented May 30, 1893.

(No Model.) 2 Sheets—Sheet 2.

R. D. NUTTALL.
TROLLEY FOR ELECTRIC CARS.

No. 498,722. Patented May 30, 1893.

Witnesses:
J. B. McGirr.
Jos. Sullivan

Inventor
R. D. Nuttall
by Connolly Bro
Attys

United States Patent Office.

ROBERT D. NUTTALL, OF ALLEGHENY, PENNSYLVANIA.

TROLLEY FOR ELECTRIC CARS.

SPECIFICATION forming part of Letters Patent No. 498,722, dated May 30, 1893.

Application filed July 14, 1891. Serial No. 399,485. (No model.)

*To all whom it may concern:*

Be it known that I, ROBERT D. NUTTALL, a citizen of the United States, residing at Allegheny, in the county of Allegheny and State of Pennsylvania, have invented certain new and useful Improvements in Trolleys for Electric Cars; and I do hereby declare the following to be a full, clear, and exact description of the invention, reference being had to the accompanying drawings, which form part of this specification.

My invention has relation to trolleys for electric railway cars and relates in particular to that class of trolleys wherein the trolley rod is caused to assume a vertical position when released from pressure through the resilient action of a spiral spring or springs so arranged with relation to the trolley supporting structure as to be compressed by the depression of the trolley rod and exerts its power by expansion to elevate the rod when the pressure is released.

My invention has for its object the provision of means, in a trolley in which the expansive power of a spring is utilized to secure the required resiliency of the trolley rod for equalizing the action of the spring so as to cause the trolley rod to have an equal degree of resiliency at whatever position it may be caused to assume.

My invention has for its further object the provision of means for preventing the trolley rod supporting devices from assuming such position that a "dead center" will be established and the action of the spring nullified.

My invention consists in the novel construction, combination and arrangement of parts hereinafter described and claimed.

Figure 1:
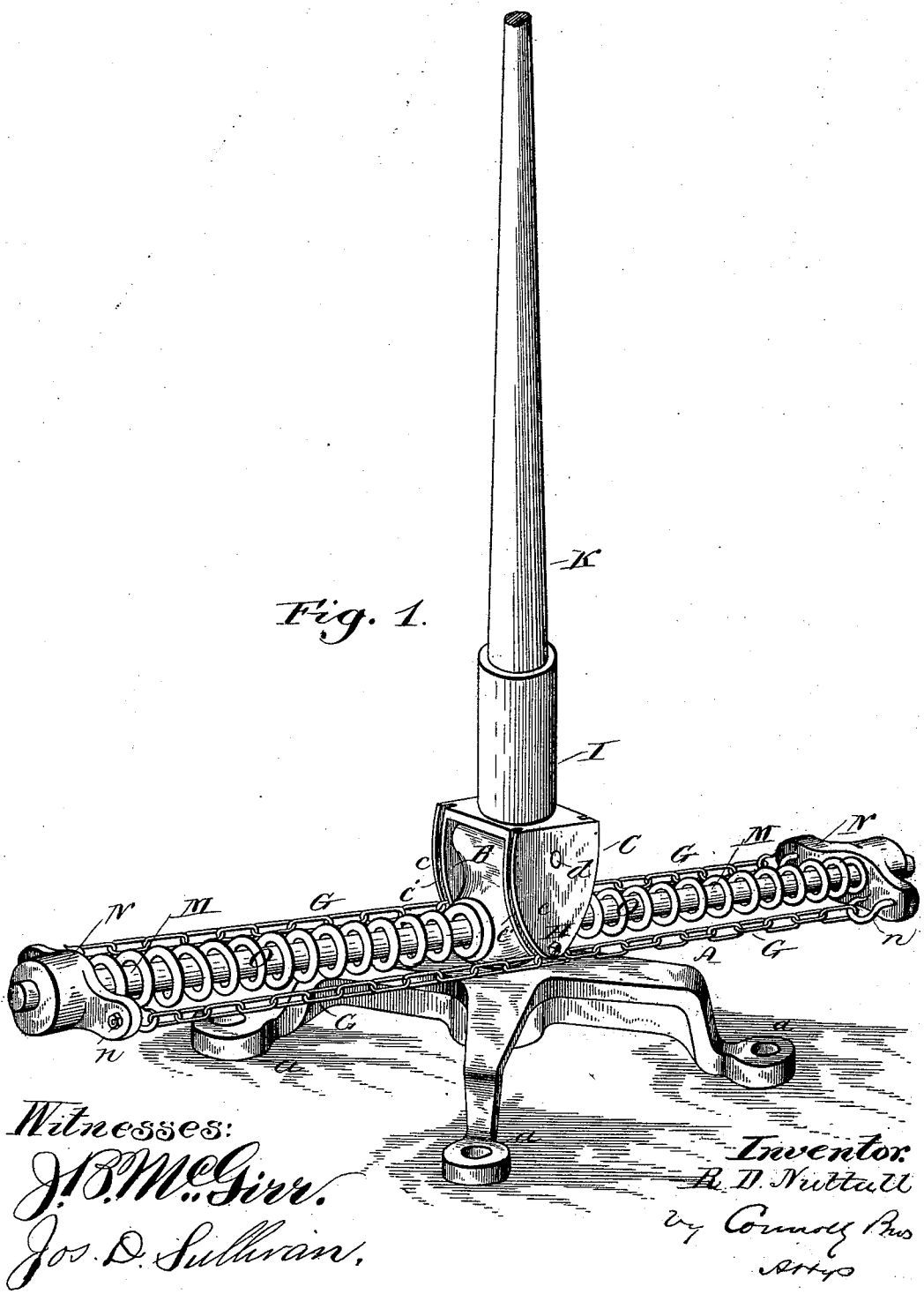
Figure 2:
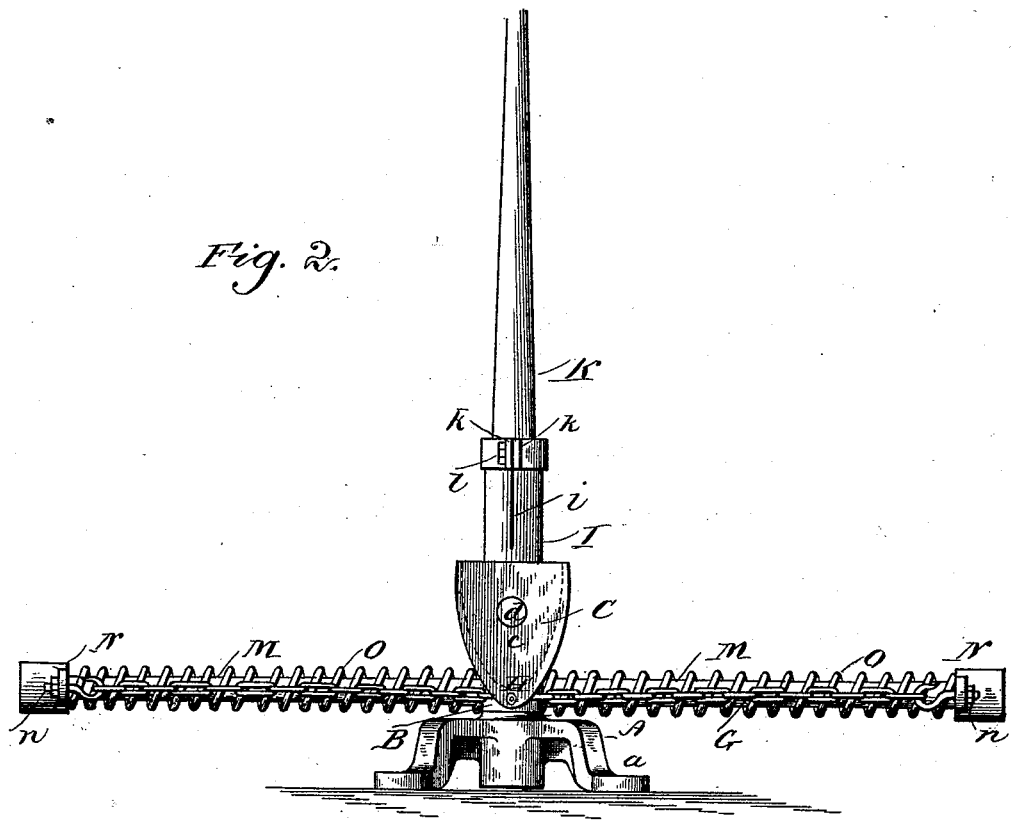

Referring to the accompanying drawings, Figure 1 is a perspective view of a trolley constructed according to my improvements. Fig. 2 is a side elevation with the trolley rod in an upright position, and Fig. 3 a similar view, but with the trolley rod depressed to the greatest possible extent.

A designates the base of the structure and *a a* the feet upon which the base is supported. A swivel head B rests upon and is swiveled on the head A, a shank on the head being set loosely in a vertical hole in the center of the base. A yoke C, is set over the swivel head and is pivoted thereon by a horizontal bolt *d*. The yoke C depends on each side of the swivel head considerably below the bolt *d* and the depending sides *c c* of the yoke are cam shaped and preferably of parabolic form and the edges of the sides are formed with grooves *c' c'* as shown, the purpose of such grooves being to receive the chains G G which are secured to the sides of the yoke within the groove by bolts H H passing through the side walls of the grooves and through a link of the chain. A socket I is formed on the yoke C and receives the lower end of the trolley rod K. Said socket is divided by a kerf *i* on one side, and lugs *k k* and a bolt *l* are provided to contract the socket and hold the trolley rod tightly therein.

A straight rod M projects laterally from each side of the swivel head B and upon the rod on each side of the head is placed a sliding cross head N and the ends of the chains G G are attached to the cross heads by bolts *n n*. Between each cross head and the side of the swivel head B and surrounding the rod M is a strong spiral spring O, the spring on each side being of equal strength. The purpose of said springs is to force the cross heads away from the swivel head by their expansive power and when the trolley rod is in a vertical position the pressure exerted on each cross head is equal, but when the trolley rod is depressed out of the vertical position the cross head on one side is drawn toward the swivel head and the spring on the same side is compressed. As the spring is compressed it becomes stiffer and the result would be, if no provision was made, that the resiliency of the trolley rod would vary with different positions, but I provide for this contingency by causing the chain to wrap around the edges of the parabolic sides of the yoke as the trolley rod is depressed whereby the difference in the strength of the spring is equalized and the equal resiliency of the trolley rod in all its positions is assured.

Figure 3:
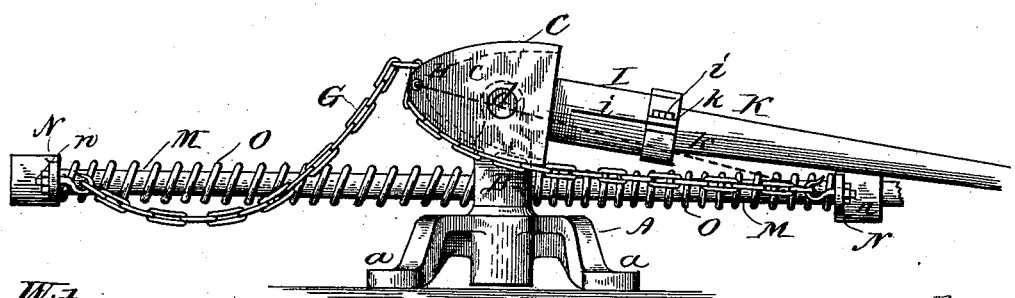

A further purpose is served by the peculiar formation of the depending sides of the yoke, that is to prevent a dead center when the trolley rod is drawn down to a very great extent. Such position is shown in Fig. 3 of the drawings and it will be observed that if the chains G G were stretched in a straight line from the bolts H H to the cross heads they would intersect the center of the horizontal pivotal bolt $d$ and a dead center would be established which would nullify the expansive force of the spring.

The establishment of a dead center is avoided in my device by reason of the fact that the chains are wound around the edges of the sides of the yoke and for this purpose it is not essential that the sides should be of the exact formation shown, since it would be equally impossible to establish a dead center if the sides of the yoke were semi-circular or any approximate shape.

Having fully described my invention, I claim—

1. In a trolley the combination with the pivoted yoke C having the cam-shaped sides $c\ c$ with grooves $c'\ c'$ of the chains G G secured to the sides and adapted to lie in the grooves, the cross heads to which said chains are secured and the spiral springs arranged between said cross heads and the yoke, substantially as described.

2. In a trolley, the combination with a pivoted yoke adapted to receive the trolley rod, an extension thereof extending below the pivotal point, a flexible connection attached to said extension, a cross head to which said flexible connection is attached, and a spring contacting with said cross head and adapted to be compressed by the movement of said yoke, substantially as described.

3. In a trolley for electric cars, the combination of a spring, a cross head arranged at the end of the spring, and a pivoted mast socket connected to said cross head, the mast socket being so constructed as to effect an inward movement of the cross head, and a corresponding compression of the spring at every point of movement of the mast socket, substantially as set forth.

In testimony that I claim the foregoing I have hereunto set my hand this 25th day of June, 1891.

ROBERT D. NUTTALL.

Witnesses:
  JOS. B. CONNOLLY,
  H. HUNNESHAGEN.